July 26, 1966  G. JANTZEN  3,262,738
RETRACTABLE SEAT BELTS
Filed March 26, 1964  2 Sheets-Sheet 2

INVENTOR.
GEORGE JANTZEN

United States Patent Office 3,262,738
Patented July 26, 1966

3,262,738
RETRACTABLE SEAT BELTS
George Jantzen, New York, N.Y., assignor to M. Steinthal & Co., Inc., New York, N.Y., a corporation of New York
Filed Mar. 26, 1964, Ser. No. 354,990
2 Claims. (Cl. 297—388)

The present invention relates to seat belt retractors and more particularly to a means for automatically providing retractor action at desired times and for preventing retractor action at undesired times.

The use of seat belts in automobiles has become increasingly widespread and important in recent times and a great deal of consideration has been given to various means for removing the inconveniences heretofore associated with seat belts to encourage their continued presence and their use by passengers. One area of consideration has been the development of seat belt retractors which take up the seat belt from the seat so that when the seat belt is not in use, it does not lie about on the seat or off the seat to twist, become dirty or catch in the vehicle door.

Most seat belt retractors have in common the principle of applying a retracting pulling force on the seat belt in such manner that the retractor itself is not part of the seat belt load-bearing arrangement. In one general form of embodiment a take-up mechanism is located off the seat and pulls the belt between the seat cushion and seat back into a stowed position off the seat.

In this and other general forms of embodiment, the retractor mechanism may exert a continuous pull on the seat belt. However, this pulling force is needed only to retract the belt and to retain the belt in its retracted position. At other times, such as while the belt is being adjusted to fit the wearer or while the belt is being worn, this pulling force may be inconvenient and uncomfortable and on occasion may even provide a dangerous condition.

The wearer has to work against the pull of the retractor while adjusting the length of the belt to a proper fit. Furthermore, while the belt is being worn by the wearer, the pull from the retractor may cause the wearer to experience an uncomfortably, snug feeling. Moreover, the wearer may mistake the snug feeling due to retractor pull for the snug feeling he normally associates with a seat belt adjusted to the correct length. In such case the wearer will believe the belt to be adjusted to the proper length when in fact the belt may be too long. Therefore, rather than providing a safety feature, the seat belt in this case provides an additional hazard since the driver operates the vehicle under the mistaken belief that the seat belts are providing a measure of safety which in fact they are not.

The present invention corrects for the above described conditions by providing a sensing arm which is connected at one end to a portion of the seat such as a seat spring, which flexes when the weight of an intended user is placed on the seat. The sensing arm actuates a means which prevents the effective application by the retractor mechanism of a retracting pull upon the belt upon flexure of the spring under weight and the resulting effective movement of the arm, and which permits the application by the retractor mechanism of a retracting pull upon the seat belt when the weight is removed from the seat and the seat spring returns to its original position. For example, a sensing arm may be attached at one end to the seat spring and at its other end to the retracting wheel mechanism, disclosed in U.S. Patent 2,830,655 issued on April 15, 1958, to G. Lalande, so that the retractor becomes automatically operative when the passenger leaves the seat, and automatically inoperative when the passenger sits on the seat. In this embodiment the sensing arm operates directly upon the retractor mechanism. In other embodiments it may be desirable for the sensing arm to operate upon an additional gripping mechanism located between the retractor and the free end of the seat belt, as will be hereinafter described in greater detail.

Accordingly, it is an object of the present invention to avoid the inconvenience and discomfort of retractor pull while the belt is being adjusted or used or temporarily unbuckled.

Another object of this invention is to provide a retractor mechanism for seat belts which automatically retracts the seat belt upon sensing a condition characteristic of the completion of its use, such as the passenger leaving the seat.

It is an additional object of this invention to prevent seat belt retractors from conveying a false snugness to the wearer which is mistakenly attributed to proper adjustment of the seat belt.

A further object of this invention is to provide a durable yet inexpensive mechanism for automatically retracting a seat belt from a seat.

A further object of this invention is to provide a retractor mechanism which places no additional hardware on the seat cushion.

A further object of this invention is to sense a condition which relates to seat belt use, such as the presence or absence of the wearer on the seat and to prevent or permit the effective application by a retractor mechanism of a retracting force upon the belt.

Another object of this invention is to retain the belt fully extended and conveniently available to the wearer while it is temporarily unbuckled while permitting the belt to be fully retracted automatically when the wearer is through with it.

These and other objects and advantages of this invention will become apparent as the description proceeds in connection with the accompanying drawing in which.

The invention will be described with reference to seat belts as used in automobiles. However, it is to be understood that the invention is equally applicable to use with seat belts wherever they may be employed, such as in air craft, boats, trucks and other forms of conveyance. Moreover, the invention will be described with reference to a particular embodiment of seat belt retractor which for the purposes of this description is chosen from its relative simplicity. It is to be further understood that the invention may be employed with other and diferent seat belt retractors. The seat belt retractor itself may be well known in the art.

In the following description reference is made to only one half of the two belt halves which make up a seat belt. It is, of course, to be understood throughout that two belt halves are required.

Figure 1:
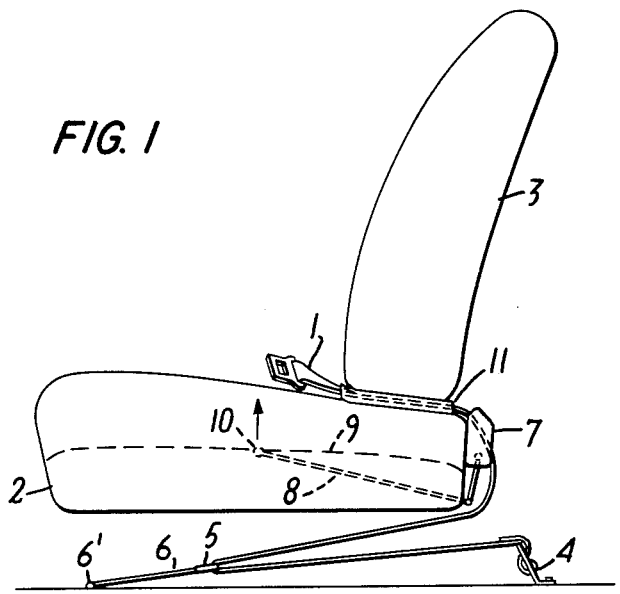
FIGURE 1 is a side elevation of an automobile or other vehicle seat showing a safety belt in a retracted position.
Figure 2:
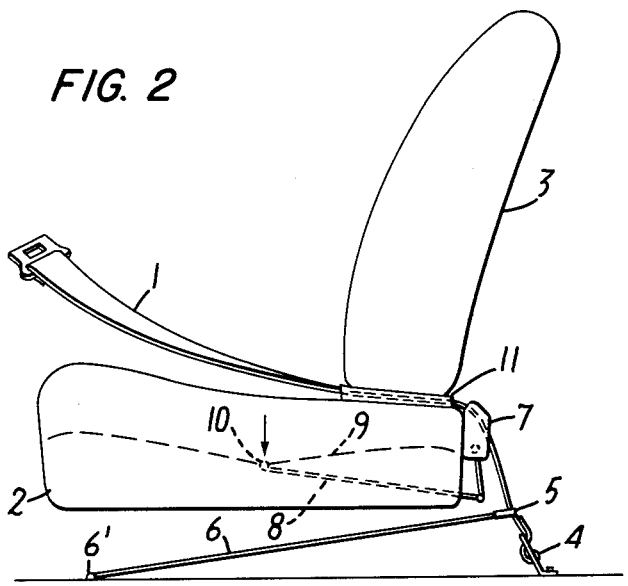
FIGURE 2 is a view similar to that of FIGURE 1, but showing the belt in extended position.

Referring now to the drawings, FIGURES 1 and 2 show a seat belt 1 in a retracted and in an extended position repectively, in place an on automobile seat which is suitably secured to the vehicle floor. The seat is composed generally of a seat cushion 2 and a back rest 3. The seat belt 1 is itself secured to the vehicle floor or other rigid vehicle member by any one of several well known means, such as anchor 4. When extended and ready for use, the seat belt 1 should be drawn up to form a straight line from the anchor 4 to the seat.

When not in use, the seat belt 1 is retracted from the seat and conveniently stowed beneath the seat so as not to twist or become dirty or fall off the seat where it may be caught in the auto door. The retractor described herein for that purpose comprises a rectangular ring 5 through which the seat belt 1 passes at a point along the seat belt 1 between the anchor 4 and the seat. Ring 5 is connected to one end of an elastic retractor line which is secured at its other end to the vehicle floor by sheet metal screw 6'.

In the retracted position the seat belt 1 is retained doubled beneath the seat by the pull from elastic retractor line 6 which, under proper adjustment, is elongated only slightly in the retracted position. When the seat belt is fully drawn up to be buckled about the wearer, elastic retractor line 6 stretches to its extreme elongated condition and the seat belt 1 runs as a straight line from its anchor 4 to the seat so that loads under collision conditions may be borne immediately and fully by the floor and the seat belt 1 retains the passenger on the seat. When the seat belt is released by the wearer, the elastic retractor line 6 is free to retract and pull the seat belt 1 into its stowed position beneath the seat once more.

It should be noted at this point that for the entire period during which the seat belt 1 is being drawn up by the wearer, adjusted to the proper length for the wearer and worn, the elastic line retractor 6 exerts a not insignificant pull on the belt. If the seat belt is fully drawn up by the wearer and properly adjusted, this continuous pull will not interfere with the proper operation of the seat belt under collision conditions. However, it has been observed that the continuous pull from seat belt retractors handicaps the wearer while adjusting the length of the belt to proper fit, so that the belt may not be fully drawn up after adjustment. Moreover, the retractor pull is transmitted to the wearer who experiences an uncomfortable, overly snug feeling.

It has been found that under such conditions, the seat belts may be adjusted too long in the first instance or readjusted too long by the wearer to relieve the overly snug feeling which is interpreted as being due to an overly tight seat belt.

To avoid the above described conditions, the present invention provides a seat belt snubber mechanism 7 through which the belt passes on its path to the seat cushion 2. The snubber 7 operates to firmly grip the seat belt 1 and prevent its retraction except at such times when the need for retraction of the seat belt is sensed. The snubber mechanism 7 does not hinder the ease of drawing up the seat belt 1 on to the seat. However, when the belt ceases to be drawn up at any stage, the snubber mechanism 7 immediately grips the belt and prevents it from being retracted, so long as a cooperating sensing mechanism senses the presence of the wearer on the seat. In this way the pull from the retractor is prevented from being transmitted to the free end of the seat belt while the wearer is preparing to use the belt or is using it.

The cooperatinng sensing mechanism takes the form of sensing arm 8 of spring wire which is attached under the seat to the seat spring 9 by a simple upholstery hook 10 or other clip at about the middle of the seat. When a wearer sits on the seat, the seat spring 9 is flexed downward, and the attached end of the sensing arm 8 moves to a lower position. This change in position is transmitted by the arm 8 to the snubber mechanism 7 to which the arm 8 is connected at its other end.

The snubber mechanism 7 responds to the change in position of the sensing arm 8 by adjusting itself to grip the seat belt whenever the belt ceases to be drawn up by the wearer.

When the wearer leaves the seat, the seat spring 9 flexes upward and the attached end of sensing arm 8 moves to its upper position. The upward movement of the sensing arm 8 causes the snubber mechanism 7 to readjust itself to a non-gripping condition which permits the belt to be pulled through tube 11 into its stowed position beneath the seat by the elastic retractor 6.

It can be seen that the presence or absence of the wearer on the seat automatically sets the condition of the snubber mechanism 7. In other words, the invention automatically senses a condition characteristic of the presence of the wearer on the seat, in this case, the weight of the wearer pressing down on the seat spring 9. So long as this condition is sensed, the invention prevents the retractor 6 from exerting a pull at the free end of the seat belt 1 and avoids the inconvenience, discomfort and dangerous false snugness associated with such pull.

The invention also automatically senses a condition characteristic of the wearer leaving the seat, in this case, the removal of the wearer's weight from the seat spring 9 and enables the seat belt 1 to be automatically retracted at that time.

Figure 3:
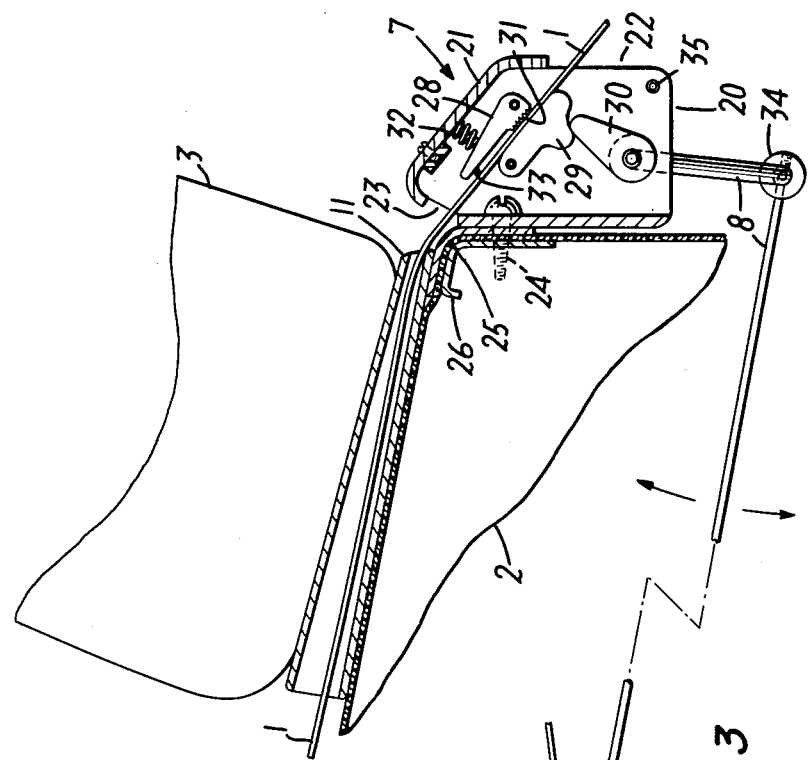
FIGURE 3 is an enlarged fragmentary view of FIGURE 1 partly in section.
Figure 4:
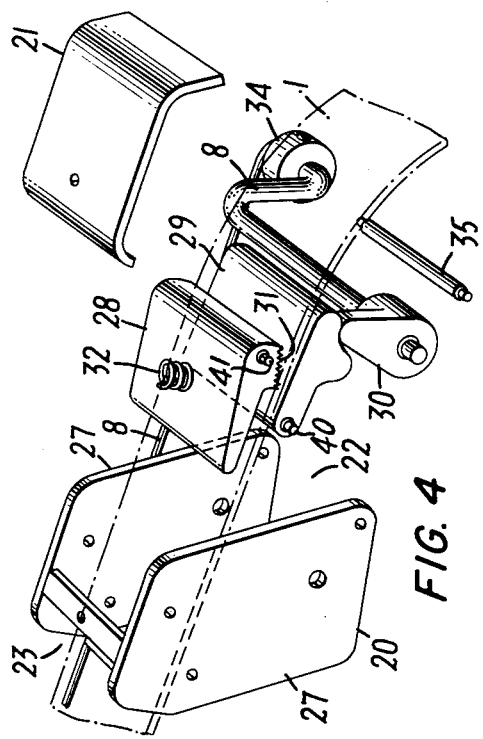
FIGURE 4 is an exploded view of the operable mechanism shown in FIGURE 3.

The details of the snubber mechanism 7 and the sensing arm 8 will now be described with reference to FIGURES 3 and 4.

The snubber mechanism 7 is made up of a housing 20 having a cover 21 thereon. The cover 21 covers only a portion of the housing 20, leaving open portions at 22 and 23 for the seat belt 1 to pass through the mechanism. Housing 20 is fastened by two self-taping screws 24 (only one of which is shown) through curved metal plate 25, through the seat material, and into a seat frame member 26. Where a seat frame member is not conveniently available in the seat, a metal backing plate should be attached to the seat springs to receive the self-taping screws 24 to support the housing 20. Tube 11 is attached to metal plate 25 on the other side of its curve. The tube 11 enables the seat belt 1 which passes through it to pass freely between the seat cushion 2 and seat back 3 without having its motion resisted by these seat portions. The curved metal plate 25 enables some relative motion between the tube 11 and the snubber housing 20, which may be necessary under normal conditions in the use of the seat.

The walls 27 of the housing 20 have a series of aligned holes in each for enabling the operative portions of the snubber mechanism 7 to be pivotably mounted within the housing 20. These operative portions are: the end of sensing arm 8, having a cam 30 mounted thereon, a snubber 29 pivotally mounted at its pivot points 40 which acts in cam follower relation to the cam 30, and a gripping cam 28 pivotally mounted at its pivot points 41 and having a grooved surface 31, which cooperates with the snubber 29 in a manner to be described.

The seat belt 1 passes above roller member 35 and between the snubber 29 and the grooved surface 31 of the gripping cam 28. Roller 35 insures that the seat belt will always be fed between these members at a proper angle. Snubber 29 and gripping cam 28 span the seat belt in its transverse direction. A compression spring 32 is seated in a hole in the top of gripping cam 28 and is compressed between the gripping cam 28 and the housing cover 21 to bias the gripping cam 28 against stop pin 33. The gripping cam 28 is a cam in the sense that its grooved gripping surface 31 increases in radial distance from its pivot axis with distance in the direction of the free end of the seat belt 1.

The operation of the snubber mechanism 7 and the sensing arm 8 is as follows:

When the wearer sits on the seat, the end of sensing arm 8 which is attached to the seat spring 9 will move downward as hereinbefore explained. This movement is transmitted by sensing arm 8, past its adjustment joint 34 to cam 30 as rotational motion. Cam 30 will rotate to a higher point and will move snubber 29 upward. Snubber 29 closes the space between it and the grooved surface 31 of gripping cam 28 and presses the seat belt 1 against grooved surface 31.

As the wearer draws up the seat belt 1 onto the seat, the seat belt 1 rides upon snubber 29 and causes gripping cam 28 to pivot away from stop pin 33 and out of pressing contact with the seat belt 1. The seat belt passes freely towards the seat.

When the belt ceases to be drawn up and commences a slight retraction movement, gripping cam 28 in contact with the moving belt will be pivoted by the motion of the seat belt towards the stop pin 33.

Since the grooved surface 31 increases in radial distance from the pivot axis of the gripping cam 28 with distance in the direction of the free end of the seat belt 1, as the gripping cam 28 pivots towards the stop pin 33, the gripping action between gripping cam 28 and snubber 29 quickly increases. The seat belt 1 is securely gripped therebetween and prevented from retracting, not withstanding the pull on the seat belt from elastic retractor 6.

The above described conditions will prevail so long as the wearer remains on the seat.

When the wearer unbuckles the seat belt and leaves the seat, this changed condition is sensed as hereinbefore explained by the upward movement of sensing arm 8. The upward movement of sensing arm 8 causes cam 30 to rotate to a lower point permitting snubber 29 to pivot downward, releasing the grip on seat belt 1.

The seat belt 1 is now released to be retracted by the pull from elastic retractor 6.

The invention has been described with reference to one embodiment which is to be regarded as illustrative rather than restrictive. Other and different embodiments may be employed which come within the scope of the invention without departing from the teachings of the invention.

What is claimed is:

1. In a vehicle, a seat, a seat belt element anchored at one end to the floor of said vehicle and extending at its free end over said seat, retractor means engaging said seat belt element for retracting said seat belt element from said seat, first and second gripping members attached to said seat and disposed near opposite faces of said seat belt element respectively and at a point forward of said retractor means in the direction of said free end of said seat belt element, said first gripping member being actuatable towards said second gripping member to grip said seat belt element between them, said second gripping member being pivotable and having a cam gripping surface thereon adapted to tighten the grip on said seat belt element when pivotally urged in the retraction direction and to release the grip on said seat belt element when pivotally urged in the opposite direction, means cooperating with said first gripping member to control the movement thereof, and means responsive to the occupancy of said seat operably connected to said means to move said first gripping member into gripping engagement with said seat belt element upon occupancy of said seat.

2. In a vehicle, a seat, a seat belt element anchored at one end to the floor of said vehicle and extending at its free end over said seat, retractor means engaging said seat belt element for retracting said seat belt element from said seat, first and second gripping members attached to said seat and disposed near opposite faces of said seat belt element respectively and at a point forward of said retractor means in the direction of said free end of said seat belt element, said first gripping member being actuatable towards said second gripping member to grip said seat belt element between them, said second gripping member being pivotable and having a gripping surface thereon which generally increases in distance from the pivot axis in the direction of said free end of said seat belt element to prevent movement of said seat belt element in the retraction direction and permit movement in the opposite direction, cam means cooperating with said first gripping member to control the movement thereof, and actuating means operably connected to rotate said cam means for moving said first gripping member into gripping engagement with said seat belt element upon occupancy of said seat.

References Cited by the Examiner

UNITED STATES PATENTS

| | | | |
|---|---|---|---|
| 2,822,595 | 2/1958 | Ruhl | 24—170 |
| 2,830,655 | 4/1958 | Lalande | 297—388 |
| 2,963,080 | 12/1960 | Zang | 297—388 |
| 2,971,730 | 2/1961 | Martin | 297—388 |
| 3,128,124 | 4/1964 | Fredericks et al. | 297—388 |

FRANK B. SHERRY, *Primary Examiner.*

R. B. FARLEY, *Assistant Examiner.*